(12) United States Patent
Henningsen

(10) Patent No.: US 6,296,383 B1
(45) Date of Patent: Oct. 2, 2001

(54) METHOD AND APPARATUS FOR CONTROLLING LIGHT

(75) Inventor: Henning Henningsen, Låsby (DK)

(73) Assignee: Dicon A/S, Lystrup (DK)

( * ) Notice: Subject to any disclaimer, the term of this patent is extended or adjusted under 35 U.S.C. 154(b) by 0 days.

(21) Appl. No.: 09/171,391

(22) PCT Filed: Apr. 17, 1997

(86) PCT No.: PCT/DK97/00171

§ 371 Date: Oct. 16, 1998

§ 102(e) Date: Oct. 16, 1998

(87) PCT Pub. No.: WO97/39277

PCT Pub. Date: Oct. 23, 1997

(30) Foreign Application Priority Data

Apr. 17, 1996 (DK) .................................... 453/96
Jun. 4, 1996 (DK) .................................... 628/96

(51) Int. Cl.$^7$ ......................................... G05D 25/00
(52) U.S. Cl. .................. 362/552; 362/551; 362/554; 362/556; 362/558; 362/581; 362/32; 385/31; 385/39; 250/221
(58) Field of Search .................... 362/551, 552, 362/554, 556, 558, 581, 31, 32, 61; 385/31, 39; 250/221

(56) References Cited

U.S. PATENT DOCUMENTS

| | | |
|---|---|---|
| 3,564,231 | 2/1971 | Bruce et al. . |
| 4,015,122 * | 3/1977 | Rubenstein ................ 250/221 |
| 4,349,259 * | 9/1982 | Meyer et al. ............... 354/135 |
| 4,531,197 * | 7/1985 | Lin ............................. 364/827 |
| 4,860,172 * | 8/1989 | Schlager et al. ............ 362/32 |
| 4,907,132 | 3/1990 | Parker . |
| 5,102,227 * | 4/1992 | Zwirner et al. ............ 356/384 |
| 5,184,883 | 2/1993 | Finch et al. . |
| 5,226,709 | 7/1993 | Labranche . |
| 5,434,756 | 7/1995 | Hsu et al. . |
| 5,475,571 | 12/1995 | Dassanayake . |
| 5,745,281 * | 4/1998 | Yi et al. ..................... 359/290 |

FOREIGN PATENT DOCUMENTS 89834   8/1993 (FI) .

* cited by examiner

*Primary Examiner*—Cassandra Spyrou
*Assistant Examiner*—Craig Curtis
(74) *Attorney, Agent, or Firm*—Pitney, Hardin, Kipp & Szuch LLP

(57) ABSTRACT

The invention relates to a method and an apparatus for controlling light from a light source (1) to a lighting location. A preferred embodiment of the invention comprises precisely one central light source (1) which is connected to a plurality of light guides (4) via a control unit (3), each of said light guides being terminated at a remote point. The control unit comprises a plurality of electrically controlled microshutters (14, 15), each of which has at least two states, an open state and a closed state, from which the light is conducted further on to the light location or locations via optical guides in the open state of the diaphragms. The light may thus be distributed by means of the control unit (3) to the individual light guides (4) in response to control signals supplied to the control unit.

19 Claims, 4 Drawing Sheets

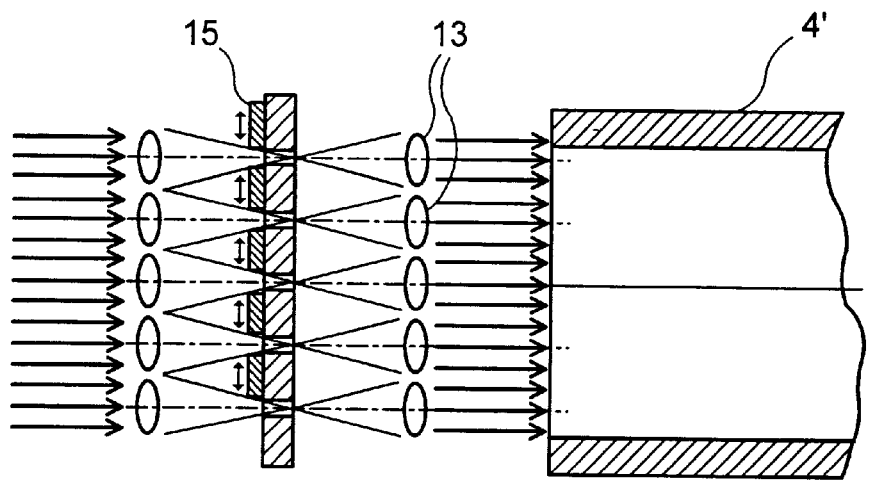
F I G. 3a
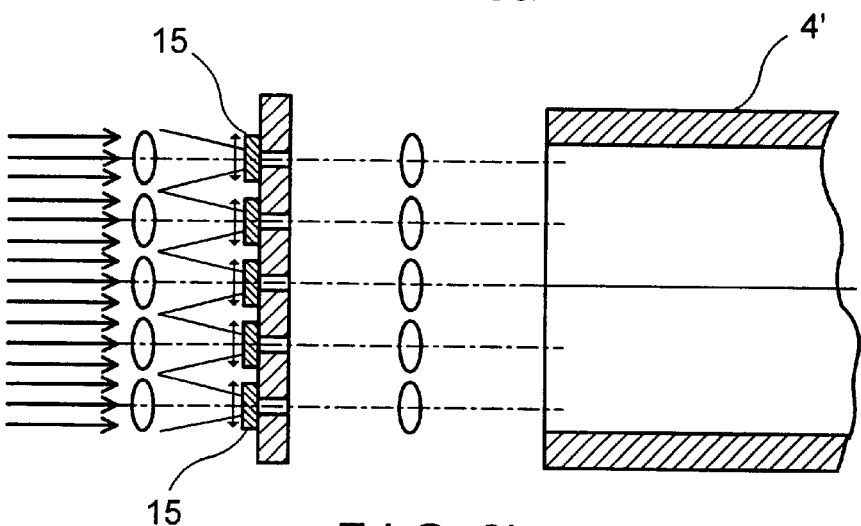
F I G. 3b
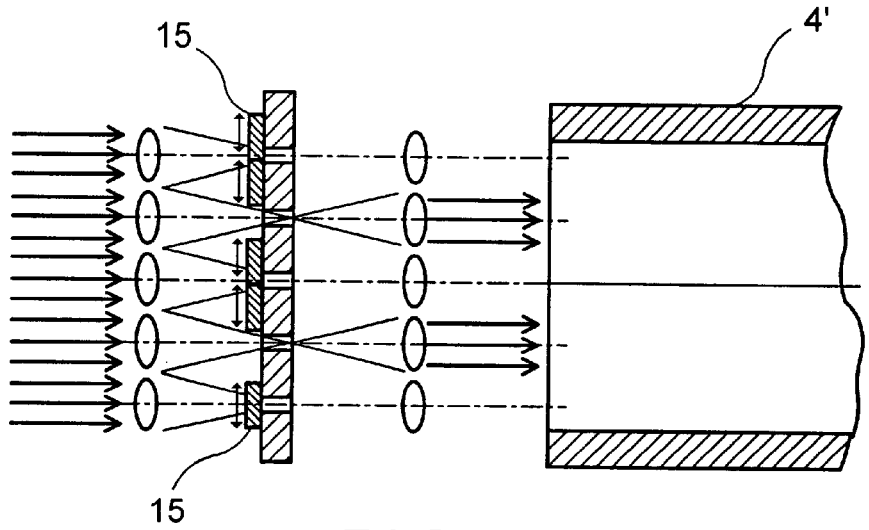
F I G. 3c

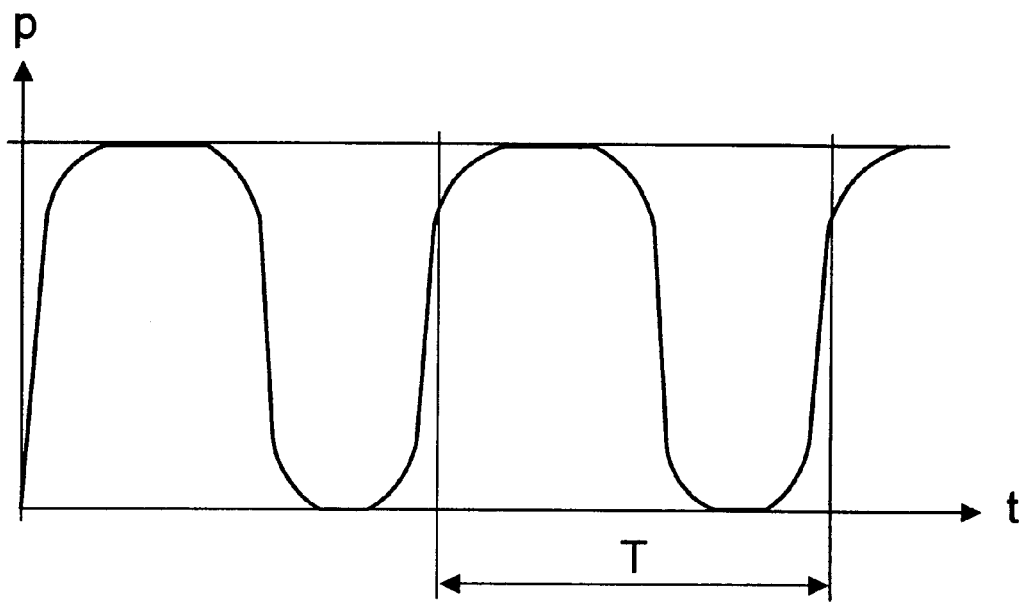
F I G. 4a
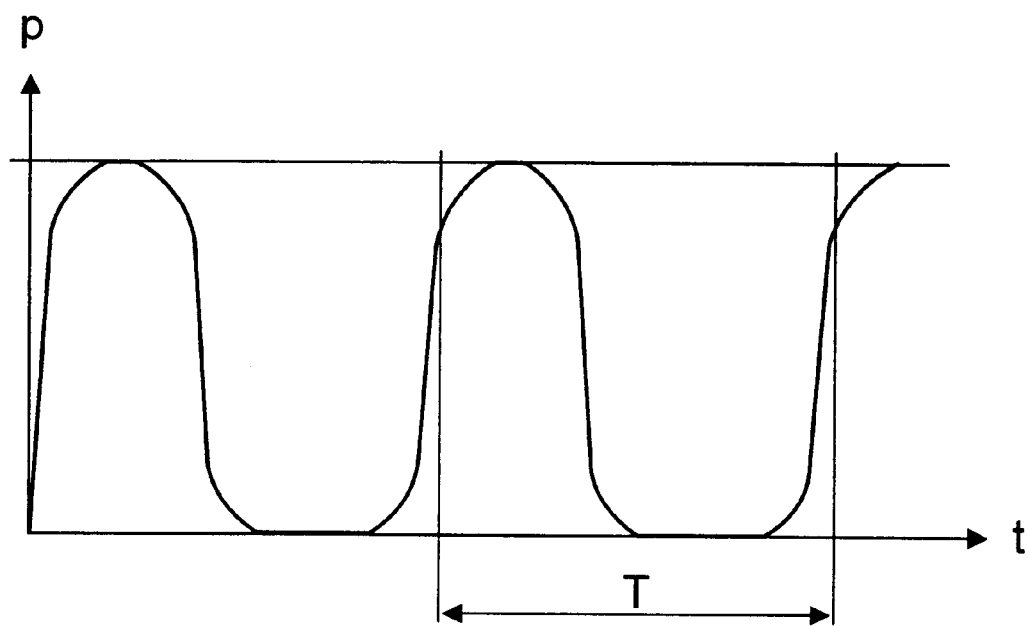
F I G. 4b

METHOD AND APPARATUS FOR CONTROLLING LIGHT

FIELD OF THE ART

The invention relates to a method of controlling light as stated in the introductory portion of claim 1, an apparatus as stated in the introductory portion of claim 11 and an optical plug as stated in the introductory portion of claim 20.

In connection with so-called remote source lighting where one or more light sources are spaced from the location where the actual lighting is to take place, efficient conduction of light with a limited or controlled loss is required. Various types of light guide technology are used in this connection, which may be adapted to the task according to the current need. Examples of such applications include endoscopy, displays and lighting purposes in general.

As the light guide technology has gradually become economically attractive, the possible applications have increased correspondingly, and consequently applications of light guide optics for e.g. lighting purposes in particular have been found to be an interesting alternative to conventional technology.

It may e.g. be applications where a smaller number of central light sources can replace decentral light sources, whereby as an alternative to e.g. a large number of conventional bulbs or lighting units a smaller number of central lighting units will suffice, which may be less subjected to wear or vandalism, may be less exacting with respect to the design of the actual light source at the lighting location, and may be considerably easier to service.

These applications, however, have given rise to certain problems in connection with e.g. the flexibility of the overall system, as it is difficult to combine the mentioned advantages with requirements for an overall dynamic system. This should be taken to mean that the application of a large number of decentral light sources allows separate control of the individual light sources, as the individual light sources may e.g. be turned on, turned off and dimmed mutually independently, while the use of e.g. a single central light source, which provides a number of decentral lighting units via light guides, lacks this flexibility.

The object of the invention is to provide a central lighting system which eliminates these drawbacks and has the same possible uses as systems of decentral lighting units.

U.S. Pat. No. 5,434,756 discloses a lighting system which is particularly useful for cars. The lighting system comprises at least one central light source which is optically connected to a lighting system of a car via fibres. The light is emitted to the individual lighting locations and is controlled by means of a special type of optical switch, which, according to the invention, consists of a fibre input end and a fibre output end which are moved mutually in order to regulate the intensity of the transmitted light. However, this type of optical switch is supplemented with a mechanical sliding macroshutter in some cases. A drawback of this lighting system is that the actual control and adjustment of the individual optical fibres are relatively complicated, and moreover the lighting system does not permit central light control, because the light switch types used are inserted at various points in the optical network.

Movement of optical fibres is costly as a mechanism for each fibre is required.

U.S. Pat. No. 5,184,883 discloses a light control system of the kind adapted to control light distribution in automobiles. The disclosed system comprises a central light source optically coupled to a shutter via light guides. A drawback of the system is that the installing and maintenance is somewhat complicated and inconvenient in practice, as all shutter units must be located at each local lighting position. Thus, every installing of a light guide must be supplemented by a local mounting of a shutter unit and a control cable adapted to control the activation of the shutter. A further disadvantage is that the system is vulnerable with respect to wear or vandalism, and electrical control wires and local shutters will have to be encapsulated carefully.

SUMMARY OF THE INVENTION

When, as stated in claim 1, the light is conducted from the central light source or sources to a control device comprising a plurality of electrically controlled microshutters, each of which having at least a closed state and an open state, from which the light is conducted further on to the lighting location or locations via one or more optical guides in the non-closed state of the microshutters, a central control of light from a central light source to a remote location is obtained.

Thus, it is apparent that various types of microshutters having mechanical diaphragms may be used within the scope of the invention, as the diaphragm characteristic as such is not decisive. For example, within the scope of the invention it is possible to use a diaphragm with several controllable shutter levels, so that the diaphragm itself provides control of the intensity of the light transmitted through the diaphragm.

A light emitter should be interpreted broadly, as a light emitter may also be a light guide, and as a result the method of the invention may thus be implemented at several levels. This means that the light may be subdivided centrally and then be conducted to the vicinity of the lighting location and be subjected to further subdivision or processing in more central positions, should this be deemed appropriate. The method may be implemented in several hierarchies so to speak.

The light sources may e.g. be high pressure mercury lamps, laser or light sources producing light of a specific colour or colour spectrum.

An example of a light guide may be a glass or plastics fibre guide which conducts light from fibre end to fibre end with a relatively small loss. Other guides, such as fluorescent tubes, in which part of the intensity of the light is dissipated to the surroundings between the end points, may likewise be used within the scope of the invention.

The method of the invention is thus in the nature of being a control of a central cross field for light, the light being conducted from the cross field via optical guides; the microshutters and optional lens system used in the cross field may be implemented by means of microtechnology.

Thus, the invention provides the possibility of minimizing optical losses, the possibility of making very use-specific and compact designs that may be put to use in very different fields, the possibility of graduating the injected intensity in each of the optical guides, the possibility of central control of the light distribution, the possibility of achieving a very high on/off ratio, the possibility of adding colour control to each individual light guide, the possibility of adapting or possibly changing each application by simple software adaptation, as the addressing and control of the individual microshutters take place purely electrically.

The method is particularly advantageous for the distribution of visible light.

When, as stated in claim 2, the light is conducted from the central light source or sources to the microshutters of the control unit via a plurality of optical guides, a practical embodiment of the invention is achieved.

When, as stated in claim 3, the light is conducted from the central light source or sources via precisely one optical guide, a simple and advantageous structure is achieved according to the invention.

When, as stated in claim 4, light is conducted to at least one lighting location via a plurality of microshutters, the intensity of the light conducted to the lighting location being dependent on the number of opened microshutters, simple and controlled intensity regulation in the individual light guides on the output of the control unit is made possible.

Thus, the invention provides the possibility of both distributing the light as such and of controlling the intensity of individual distributed light signals.

When, as stated in claim 5, the light is conducted to the lighting location from the control unit via precisely one optical guide, a simple and practical embodiment of the invention is achieved, with all the advantages mentioned in the foregoing.

When, as stated in claim 6, the light from the light source is focused in the microshutter of the control unit by means of one or more optical elements and is then conducted from the control unit to the light guides via additional optical elements, it is possible to achieve optimum control of the distributed light relative to control unit as well as light guide cables.

When, as stated in claim 7, the intensity of the light at at least one lighting location is controlled by gradual opening and closing of an associated microshutter, flexible control of the light intensity at the lighting location or locations is achieved, as gradual control of the diaphragms in the control unit permits simple control of the light intensity at the individual lighting locations using few components.

When, as stated in claim 8, the light is conducted from the central light source or sources to the microshutters of the control unit via at least one inserted diaphragm whose light passage is regulated by gradual closing of the diaphragm, it is possible to regulate the supply of light to the control unit.

This may be a possibility e.g. in connection with standby or energy-saving lighting where the system as a whole is dimmed.

However, the possibility is most attractive when the system operates as a subdivision system, as the invention thus allows the entire subsystem, e.g. instrument lighting, to be dimmed, without regulating the central light emitter.

The possibility is also attractive in connection with automatic regulation of a subsystem on the basis of background lighting, as the method may thus be implemented by control of the lighting level of the subsystem on the basis of sensor signals which measure the background lighting.

When, as stated in claim 9, the light is conducted from the central light source of sources to lighting locations under temporal control, the relation between the period of time during which one or more microshutters are open and closed being regulated to provide a given intensity at the individual microshutters, a simple and advantageous embodiment of the invention is achieved. Intensity regulation may thus be performed both rapidly and continuously using few means, as no substantial mechanical or electrical changes are required in order to achieve good control results. It may be mentioned e.g. that a software change in the existing and necessary diaphragm control is sufficient in several cases.

When, as stated in claim 10, the period time of one or more of said microshutters is constant, it being possible to regulate the duty cycle from 0 to 100% as needed, a simple and advantageous embodiment of the invention is achieved, as dimensioning to the desired end result of the desired method is relatively simple, because the result is primarily achieved by regulating precisely one parameter, viz. the duty cycle.

The term duty cycle is taken to mean opening time relative to the total period time.

When, as stated in claim 11, the central light source or sources are arranged in such a way that light is conducted from the central light source or sources to at least one optical control device, each comprising a plurality of electrically individually controlled micro-mechanical shutters, each of which having at least two states, a closed state and an open state, from which the light is conducted further on to the lighting location or locations via optical guides in the open state of the microshutters, each light guide being arranged to receive light from at least one microshutter, a very advantageous apparatus for central control of the distribution of light to lighting locations is achieved while previously simple on/off control of each individual optical guide has been required using a switch inserted somewhere in front of, behind or in the light guide.

The apparatus, with the advantageous positioning of electrically controlled microshutters, makes it possible to isolate the required electrical control in very compact units, as e.g. electrical wiring to the lighting locations is avoided completely according to the invention.

This provides savings with respect to materials and design and also considerably improves safety and stability in potentially moist or dirty environments.

An example of the number of microshutters in a control device may be 500–1000.

When, as stated in claim 12, each microshutter comprises a light channel and an associated electrically activatable diaphragm device, an advantageous embodiment of the invention is achieved.

Thus, according to the present invention it is possible to achieve a very high on/off ratio, i.e. the relation between how much light passes a microshutter in the open state and the closed state, respectively.

The concrete type of microshutter is thus taken to mean a hole which forms a light channel through which light may be transmitted without using mirrors, it being possible to mechanically block and release the aperture by means of an electrically activatable mechanical diaphragm.

The shape of the light channel may be adapted to the individual applications by suitable variation of e.g. cross-section.

When at least one of the light sources is arranged to illuminate a plurality of microshutters via a first lens arrangement, said lens arrangement comprising at least one microlens so arranged with respect to each microshutter that the light emitted by the light source or sources are focused on or in the vicinity of the optical axis of the light channel of the individual microshutters, a further advantageous embodiment of the invention is achieved.

Light from the light source or one of the light sources is thus focused in the individual microshutters which can thus modulate the supplied continuous light at a lighting location.

It has thus been found that for many critical lighting purposes sufficient optical energy or intensity may be provided from one light emitter to several microshutters at the same time. According to the invention, it will thus be sufficient to subdivide the microshutters used in smaller groups.

It has likewise been found that a collimated light beam may be focused in several different microshutters with minimum losses.

Thus, according to the invention it is possible to illuminate several shutters with one light source or one light emitter in the form of e.g. an optical fibre end.

It has likewise been found that it is possible to achieve and maintain a high lighting intensity at the individual lighting locations by individual control of the light guides at a very small switching rate.

When, as stated in claim 13, the focal plane of the focusing optics at the inlet side of the microshutters coincides completely or approximately with the diaphragm of the individual microshutters, a practical embodiment of the invention is achieved, since inter alia this focusing on the actual diaphragm device allows an approximately instantaneous switching to be performed in the individual microshutters, without this giving a perception of gradual sliding switching between on and off at the lighting location concerned.

Furthermore, the diaphragm device may have a smaller extent and thereby a smaller mass and inertia, thereby minimizing the switching time.

When, as stated in claim 14, the activatable diaphragm devices are formed by plates which are pivotally hinged to the microshutter arrangement, an advantageous embodiment of the invention is achieved.

When, as stated in claim 15, the diaphragm device of each individual microshutter is formed by an oscillating diaphragm element which is movable back and forth between two positions, the oscillating diaphragm element being suspended such that elastic forces are applied to an equilibrium position between the two positions, said lighting device additionally comprising a control unit for controlling the oscillating diaphragm element by means of electrostatic forces, said diaphragm element blocking the light channel of the microshutter in one of the two positions, it is possible to achieve rapid modulation since the natural frequency of the oscillating element, as a function of the oscillation parameters of the element, such as mass, elasticity and geometry as well as inner and outer forces, determines the switching time of the microshutter.

The response time of the individual microshutters to a given control signal from the control unit is thus amplified by the natural frequency of the oscillating system, which may thus be dimensioned to the desired switching time.

A further advantage of the above-mentioned microshutter type is that it is possible to achieve a very high coefficient of utilization of the modulated light since the modulation takes place in a purely transmissive design.

Additionally, the said microshutter type may be dimensioned to very small switching times, which are e.g. necessary when e.g. a purely temporal intensity modulation is desired, e.g. in case of frequency modulation, to avoid flickering lighting.

When, as stated in claim 16, the optical connection between the control device and the light source or sources is formed by one or more light guides arranged to receive light from the light sources and to illuminate the microshutters of the control unit, a particularly advantageous embodiment of the invention is achieved.

Optical guides are taken to mean optical fibres, selfoc guides, etc.

When using optical guides as light emitters and when connecting these optically to a light source, it is possible to guide a large amount of light to the lighting location in an optimum manner. This is the case particularly if e.g. arc lamps are used as light sources, since these emit considerably less well-defined light than is the case with e.g. lasers.

It will moreover be possible to graduate the amount of light which is injected into each individual light guide, e.g. by using different grey filters depending on the spatial position of the injection optics with respect to the arc of the light source.

The use of light guides, such as optical fibres, allows the light source or sources to be positioned centrally at a distance from the modulation device, which facilitates service and cooling.

Also an additional degree of freedom in the positioning of the light sources is achieved, which makes design and construction easier. This should be seen as an advantage especially when recalling that the physical extent of the light sources when arranged directly above the shutters is exacting with respect to the dimensioning of a lighting system, where a relatively high exposure resolution is desired.

Considerations of space thus limit the lighting system to a smaller degree, as it may be easier to arrange light guide ends than light sources directly above the microshutter arrangements, because fibre ends usually have a smaller extent than the light sources.

When using light guides or optical fibres as light emitters that may be connected physically to a light source, it is also possible to manufacture very compact lighting units which may be built together to larger lighting units in a relatively simple manner, and it is also possible to build these lighting units together primarily in consideration of the physical lighting conditions that might be needed, as the optical transmission between lighting source and the individual lighting locations or the overall lighting location is not critical with respect to the physical position of the individual lighting units or the necessary position of the light sources in the overall lighting system.

It will likewise be possible to place the light sources at a distance from sensitive components that might be incorporated in the structure, for which reason the operation of the overall operation may be reduced strongly, which should be seen as a special advantage when using a large number of laser sources.

When, as stated in claim 17, at least one of the optical guides is arranged to receive light from a plurality of microshutters, an advantageous embodiment of the invention is achieved, as the intensity of the light injected into the optical guide or guides concerned may be controlled by opening a selected number of the microshutters which feed the optical guide or guides.

This permits a very simple, fine and rapid control of injected light in the individual light guides.

The invention thus makes it possible to provide a direct digital modulated light intensity at a lighting location.

Further, by adding colour filters in specific microshutters or microshutter groups to the same light guide, it is possible to change colour and intensity under simple digital control on the lighting location corresponding to the light guide. The control of this process is moreover much more attractive in its implementation, since the somewhat extensive data control is just to be applied to one or a very small number of devices for the control of light.

It should be noted that the above-mentioned embodiment may be combined with light guides which are just illuminated by precisely one microshutter when e.g. a simple on/off control is desired for concrete lighting purposes.

When the microshutters of the control device are arranged in a circular face shape, an advantageous embodiment is achieved, which is particularly pronounced when the illumination of the control device has a circular cross-section, since the coefficient of utilization is increased.

It should be mentioned that the face profile of a light emitter is frequently circular, and it should likewise be stressed that the face shapes of microshutters may be adapted to arbitrary light emitter face profiles, of course.

When, as stated in claim 18, the apparatus comprises a digital control unit for individual electrical control of the individual microshutters, said control unit comprising an allocation profile for face definition of the microshutters comprised by the optical control unit which are to be modulated, an advantageous embodiment of the invention is achieved, since the programmable "output face" may be adapted to all desired coupled light guide numbers, light guide positions and light guide cross-sections.

The term allocation profile should be taken to mean mapping of a layout on the microshutters of the control device.

This unique software definition of an output profile is extremely flexible by nature and may instantaneously be changed, if given optical guides are replaced or if it is desired to change the combined addressing of several light guides.

When, as stated in claim 19, at least one microshutter is connected optically to a colour filter, a particularly attractive embodiment of the invention is achieved.

Thus, according to the invention, a colour filter may be placed over a plurality of microshutters, just as individual microshutters are provided with a colour filter in principle.

Also, the colour filter may e.g. be inserted between the control unit and one or more light guides, just as a colour filter may be inserted between the control unit and part of a light guide cross-section.

Thus, it is possible according to the invention, e.g. in connection with cars or corresponding applications, to "add" the colour centrally, thereby providing an additional degree of freedom in the design of the lighting system. It is also possible to allocate individual light emitters to several purposes, since colour, intensity, and on/off control may be performed centrally and entirely digitally. A further possibility is e.g. to avoid the physical position of fog rear lights, since the function of these can be achieved by the same light emitter as provides the normal rear light, and the intensity may be increased centrally in a simple manner.

It will be appreciated that colour change may be performed on a single light guide, and also that it is possible e.g. to place two or more colour filter, each between a corresponding light guide and the corresponding microshutter or microshutters, and subsequently to join light guides to one light guide which conducts to one lighting location by means of e.g. a T coupler or star coupler, thereby enabling colour change at the lighting location by simply addressing another of the said light guides with another colour filter or opening another set of colour filters/microshutters for the same fibre.

It will likewise be appreciated that not only regular colour changes may be obtained, but also colour shade changes by e.g. RGB modulation, if an even number of microshutters with associated RGB filters, e.g. 6 red filters, 6 green filters and 6 blue filters, address one light guide.

When, as stated in claim 20, an optical plug comprises at least two light guides having a light-receiving end and light-emitting end, said light-receiving ends being mutually fixed in a fixing device with respect to the cross-section of the light guides, so that the light-receiving ends of the light guide together form a light-receiving end or face for the optical plug, wherein the said light receiving ends forms a well-defined allocation pattern of separated light receiving ends, advantageous coupling of the light guides to the control device is possible, since the above-mentioned plug may be fixed relative to the control device and the microshutters thereof in a simple mechanical manner and thereby receive and distribute light to the lighting locations.

A further advantage of the concrete embodiment is that such a plug is simple to handle and mount, just as later replacement with another plug is also possible.

The mechanical structure of the optical plug is likewise simple to standardize for many widely different applications.

The optical plug is also simple to distribute, and, moreover, it is advantageous that an optical lighting network of light guides may be defined and determined uniquely by a manufacturer without necessarily having to consider how others distribute the light-receiving ends in the plug.

When, as stated in claim 21, the light-receiving ends of the light guides are embedded in the fixing device, an advantageous embodiment of the invention is achieved, as the plug may thus be built as a compact unit which, when mounted in an apparatus of the invention, only requires that the plug is fixed in an outlet relative to the control unit, the individual light guides being subsequently run to the corresponding lighting locations. All other special adaptation may thus take place software-wise.

DRAWINGS

The invention will be described below with reference to the drawings, in which

FIGS. 1a and 1b show an overall sketch of a preferred embodiment of the invention, FIG. 2 shows a preferred embodiment of the invention, FIGS. 3a–3c illustrate the function of a further embodiment of the invention, and where FIGS. 4a and 4b illustrate a further embodiment of the invention, FIG. 5 shows a cross-section of a compact lighting unit according to the invention, FIG. 6 shows the light-receiving end of an optical plug according to the invention, FIG. 7 shows the light-receiving end of a further optical plug according to the invention, and FIG. 8 shows the optical plug of FIG. 6 in perspective view.

EXAMPLE

FIG. 1a shows a bulb or a light source 1 and an associated reflector 2 positioned so that the light emitted from the light source 1 is conducted to a control unit 3 in a suitable manner. The light is distributed in the control unit 3 to a plurality of light guides 4, said control unit 3, in addition to distributing the light to be light guides 4, being capable of turning on, turning off and dimming the light in the individual light guides 4.

Optical guides are broadly taken to mean optical fibres, selfoc guides, etc.

FIG. 1b shows an alternative embodiment of the invention, where the light is conducted from the light source to the control unit 3 via a light guide or a light guide bundle FIG. 2 shows a somewhat more specified embodiment of the invention.

A single light guide 5' conducts light originating from the light source to a control unit 3 from which the light is passed further on to a plurality of light guides 4'.

The control unit 3 comprises an input side 10 and an output side 20.

The light is conducted from the input side 10 via one or more apertures to a lens system comprising a plurality of lenses 11, each of which focuses part of the light in a corresponding diaphragm aperture 12 in the plate 14. The light is conducted from the diaphragm aperture 12 to a further lens system comprising a plurality of lenses 13, the light from each lens 13 being focused in a corresponding light guide 4'.

Further, a plurality of electrically individually addressable and activatable diaphragms 15 are arranged in connection with the diaphragm apertures 12 of the plate 14, said diaphragms 15 being capable of allowing and blocking light passage in the diaphragm apertures 12 on the basis of electrical control signals. The individual diaphragm apertures 14 or holes with associated diaphragms are frequently referred to as microshutters for explanatory reasons.

Lens systems as well as microshutters may be constructed by means of microtechnology.

Microshutters or light valves are broadly taken to mean transmissive light diaphragms, which may e.g. be formed by micromechanical shutters.

The individual microshutters may e.g. be of the type which is described in French Patent Application No. 9412928 or the corresponding EP-A 709 706, it being decisive according to the present embodiment that the light to be modulated is transmitted directly through the individual microshutter to achieve a minimum transmission loss.

It should be noted in this connection that the microshutters described in the above-mentioned patent application are particularly advantageous in connection with this invention, since the microshutters may have a very small rise/fall time to achieve a flicker-free, even illumination.

Each light valve has at least one individually addressable open and closed state, which states provide minimum dimming and maximum dimming, respectively, of the light passing through the associated light channel.

In this connection micromechanical shutters have the advantage that the dimming in the above-mentioned two states is actually optimum, as the dimming of the light is provided physically by a micromechanical plate or the like which in the state of maximum dimming simply blocks light passage, and in the state of minimum dimming does not give rise to dimming of the light beam in principle.

Thus, according to the embodiment shown it is possible to distribute the light from one light source in the form of the light guide 5' to a large number of light guides 4'.

Although the light guides 4' have the same diameter in the embodiment shown, it will be appreciated that the diameter of the individual light guides may be adapted to the concrete application, and it will also be appreciated that several microshutters may modulate light in the same light guide.

FIGS. 3a-c show the function of a further embodiment of the invention, where FIG. 3a shows a control unit 3 which corresponds to the control unit shown in FIG. 2 with respect to the input side.

However, the output side is modified in the sense that all the lenses 13 conduct light to the same light guide 4' in this embodiment.

As will be seen, all the diaphragms 15 allow light transmission, and the light intensity in the light guide 41 is therefore maximum.

FIG. 3b shows the same control unit 3, all diaphragms 15 being closed by means of a control unit not shown, so that the light intensity in the light guide 4' is minimum or zero, as the transmission of light through the diaphragm aperture is interrupted.

FIG. 3c shows the same control unit 3, where only some of the diaphragms 15 are closed, so that the light transmission through the diaphragm apertures provides a reduced light intensity in the light guide 4' relative to maximum transmission.

The individual diaphragms may thus be addressed individually, thereby permitting any combination of diaphragm characteristics. For example, some of the diaphragms may be arranged for individual light guides, as shown in FIG. 2, allowing these to be turned on and off individually, while others of the diaphragms may be arranged for a single light guide, as shown in FIG. 3, thereby allowing the light intensity to be controlled in this light guide by varying the number of open diaphragms associated with this single light guide.

FIGS. 4a and 4b show an example of how the intensity may be controlled by the individual microshutters.

FIG. 4a shows an example of how the individual microshutters may be controlled for regulating the intensity of the light which is passed further on to the individual optical fibres.

FIGS. 4a and 4b show the state (position) of the individual diaphragm as a function of time (TIME), the low state indicating the closed state of the diaphragm element, the high state indicating the open state of the diaphragm element.

In the example shown, the diaphragm element is controlled with a constant period T, where the duty cycle is used for controlling the intensity of the light.

When dimensioning such microshutters with associated control it is to be ensured that the frequency is above a certain minimum, e.g. 50 Hz, if flicker-free light is desired at the lighting location.

It is shown in FIG. 4a how a diaphragm characteristic may be implemented, the duty cycle being relatively high (in this case greater than 50%), thereby achieving a high intensity, while the duty cycle in FIG. 4b is relatively low (below 50%), thereby achieving a low intensity.

It will be appreciated that this type of control of the individual microshutters may be combined with other control principles or structures within the scope of the invention.

It is also possible to use other types of temporal regulation of the intensity at the lighting locations within the scope of the invention. An example is intensity regulation by regulating the period time T and maintaining the opening time of the microshutters.

Figure 1A:
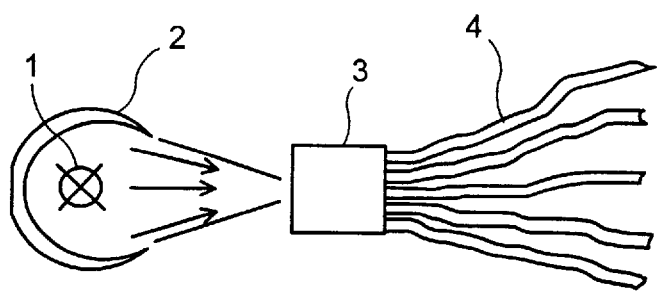
Figure 1B:
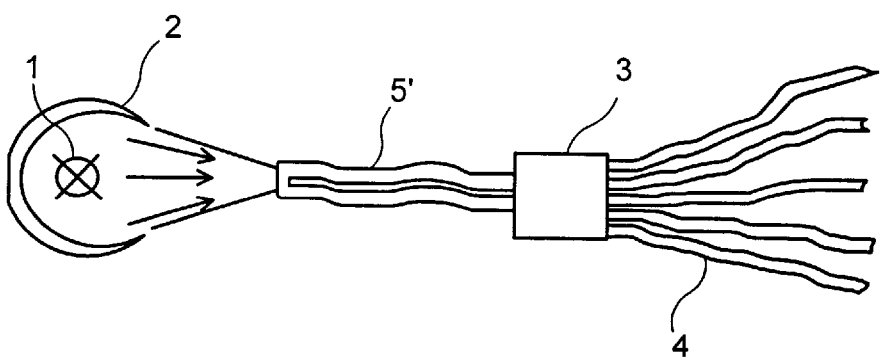
Figure 2:
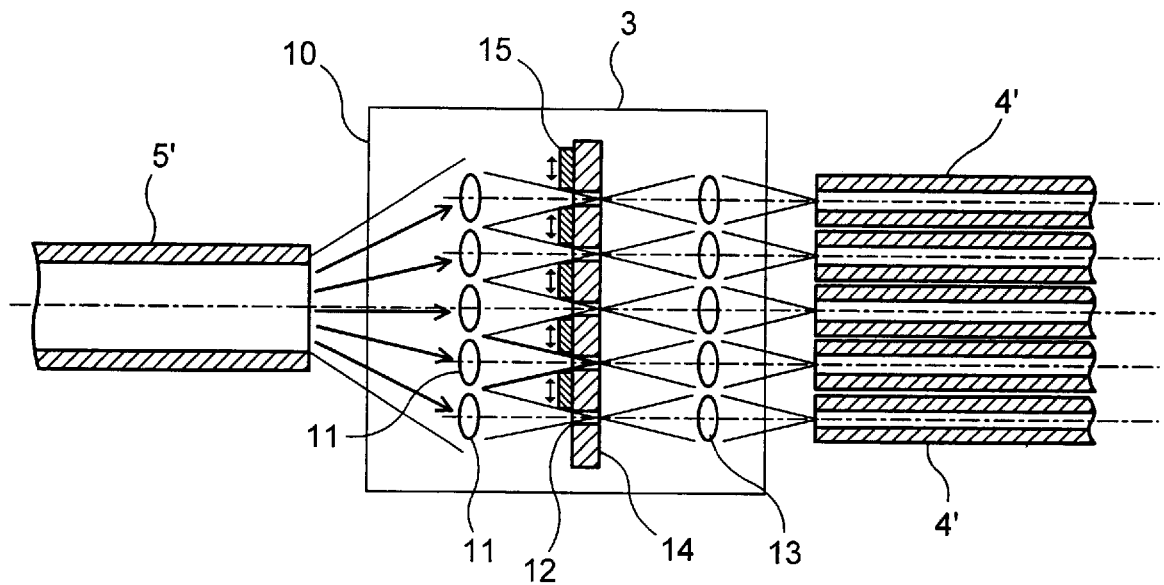
Figure 5:
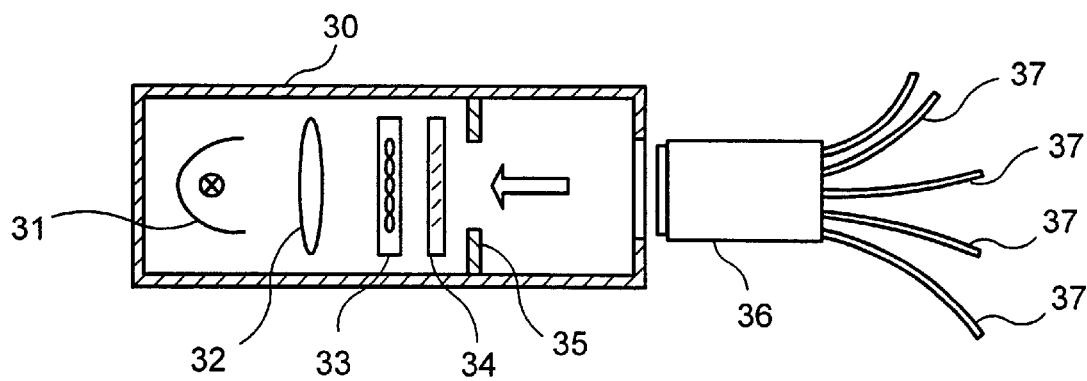

FIG. 5 shows a further embodiment of the invention, where a lighting unit 30 comprises a light source in the form of a lamp 31 with associated reflector, which is arranged to illuminate collimation optics 32, which subsequently conduct light to a microlens arrangement 33 which in turn focuses incident light in a microshutter array 34.

The microshutter array 34 is additionally connected to a control unit (not shown), which is capable of modulating, i.e. turning on and off the individual microshutters, and also capable of defining common faces of microshutters which together illuminate a light guide connected to the lighting unit.

The lighting unit is finally provided with an engagement part 35.

FIG. 5 shows, together with the lighting unit 30, an associated optical plug 36 which fixes light-receiving ends of optical fibres 37. The optical fibres conduct further on to light locations not shown.

When mounted in the lighting unit 30, the plug 36 fixes the optical fibres uniquely relative to the microshutter array, and suitable digital control of the microshutter array 34 ensures the desired illumination at the lighting locations.

It should be stressed that the embodiment shown is simplified for illustrative purposes, as practical structures may comprise several hundred microshutters, just as each light guide 37 will frequently be illuminated in practice by a face shape consisting of many microshutters.

Illumination of a single optical fibre 37 with a large number of microshutters e.g. provides the possibility of controlling and graduating the light intensity in a simple manner at the corresponding lighting location by varying the number of open microshutters in the microshutter array 34.

Figure 6:
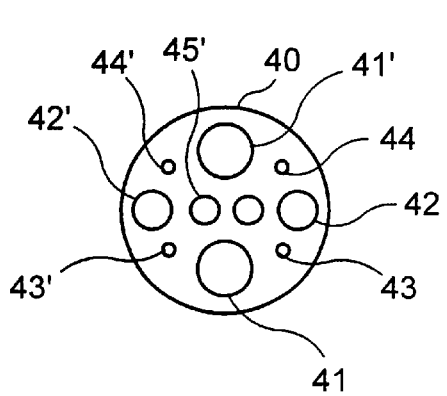

FIG. 6 shows an example of how a light receiving end of an optical plug 40 with associated optical guides in the form of e.g. optical fibres may be constructed according to the invention.

Light-receiving ends 41–45 and 41'–45' are thus fixed mutually with respect to the cross-section of the plug 40 so that they form the light-receiving end of the plug 40.

The plug 40 shown may e.g. be for use in a car where one central light source illuminates the shown light-receiving ends via a lighting unit according to the invention.

It should be noted that, according to the invention, it is possible to construct the shown optical cables specifically for concrete applications for use with quite the same type of lighting source.

This means e.g. that a product program with differently designed light receiving ends may be used with one and the same lighting unit 30, as the adaptation of the lighting unit to the optical cable may be performed software-wise by addressing other sets of microshutters which physically correspond to the plug used.

Figure 7:
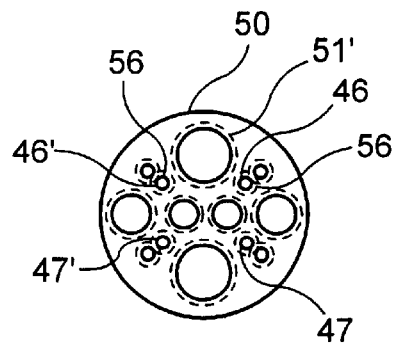

FIG. 7 shows an example of such an application, where a plug of the type shown in FIG. 6 is provided with four light-receiving ends of optical fibres 46, 46', 47 and 47'.

These optical guides may e.g. be intended to conduct light to a product type which has an additional lighting need relative to the product type that might correspond to the one shown in FIG. 6.

It should be noted, as mentioned above, that a lighting unit may be used as a standard unit in all product types, if only the physical/mechanical outer shape is maintained, since the adaptation of the lighting unit to the optical cable may take place software-wise, as mentioned above.

To illustrate this principle, some profiles in the allocation profile in a microshutter array corresponding to the one shown in FIG. 5 are shown as dashed circles 51, 56 and 56', as precisely the number of selected microshutters within the circles 51, 56 and 56' together illuminate the corresponding fibre ends 41, 46 and 46'. These allocation circles may thus be subjected to a uniform or at least cooperating control in the form of e.g. intensity or colour control, as all microshutters within the shown circles 51, 56 and 56' are separately associated with precisely one fibre end. It should be stressed again that this allocation can take place software-wise, just as the microshutters outside the corresponding allocation circles will typically and advantageously be blocked completely.

Each allocation profile 51, 56 and 56' is addressed e.g. by 20–200 microshutters which are subsequently subjected to a coordinated control algorithm, the purpose of which is e.g. that all microshutters in the allocation profile are opened or closed at the same time.

If intensity modulation is desired, one or more of the above-mentioned allocation profiles may e.g. be frequency-modulated, an alternative being to determine a strategy as to which light levels are desired at the lighting location and which microshutters in the allocation profile are to be open or closed for these light levels.

Figure 8:
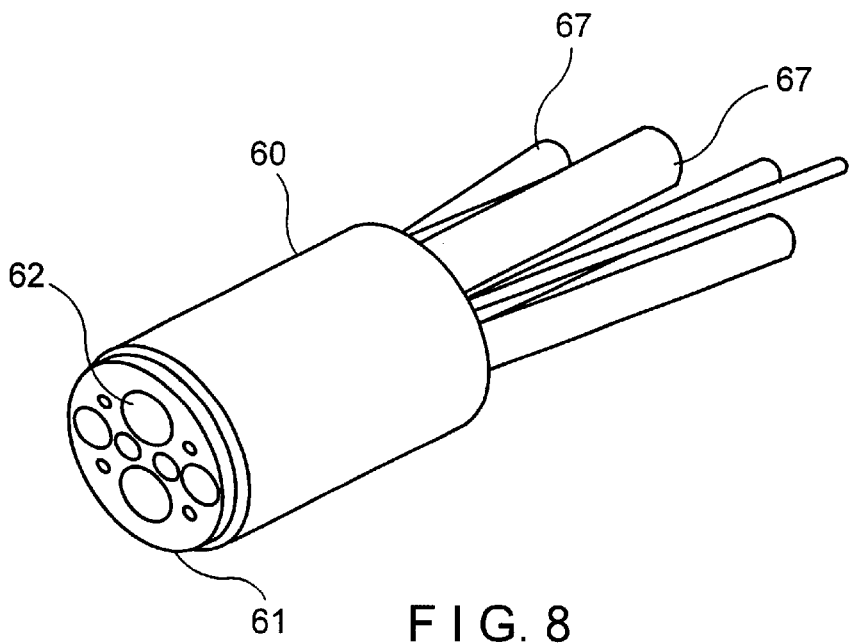

FIG. 8 is a perspective view of the structure of a plug corresponding to the plug shown in FIG. 6.

The shown plug 60 comprises a light-receiving end 61 and associated optical fibres 67, each of which has their light-receiving end 62 fixed in the plug 60.

The mechanical structure of the plug may be provided suitably, depending on the necessary dimensioning and possible need for fixation of the plug in the corresponding lighting unit both in the longitudinal direction and the direction of rotation of the plug 60.

Finally, it should be mentioned that the above-mentioned light control system may be used to advantage for the control of light in a car, it being possible to use one central light source optionally with a backup system for some of or all the lighting requirements that might exist in the car. Examples in addition to the externally mounted lights of the car include instrument panel lighting, interior lighting, contact lighting, etc. The invention partly enables simplified control of whether the light in the individual lighting devices actually works, partly simplifies the service considerably. The control of light in the car may thus be simplified and centralized at reduced costs.

However, the invention may be put to many other uses. An example is displays where precisely one matrix of fibre ends can describe arbitrary combinations, e.g. characters, with one light source with electrical control, while the known principles require the use of separately arranged fibre ends for each desired character.

Further, it is possible to manufacture displays, e.g. in the form of flat panel displays, capable of showing moving pictures.

Also, as an overall aspect, it should be mentioned that the invention enables simple digital light control with a very great freedom in the adaptation of the individual light controls to the uses that might be desirable.

It should be stressed that, within the scope of the invention, it is possible to subdivide the light control into several central control units each of which subdivides supplied light hierarchically.

An example of a subdivision might be a main unit that distributes light to the front and rear lights, parking lights, flashing indicators, etc. of the car, just as a single light guide, or an optical fibre, conducts light from the main unit to a subunit, which may e.g. be positioned in the vicinity of the instruments of the car, from which a subunit distributes light individually to the individual lights or positions at the instrument panel.

This hierarchic subdivision e.g. enables automatic regulation of intensity and colour at the individual lighting locations as a function of background lighting, which may be provided in the main unit or the subunit according to the intended purpose.

This will be particularly advantageous if the subunit e.g. provides pixel lighting in e.g. a speedometer or other purely digitally constructed instruments, as each pixel in a display is controlled by a microshutter and associated light guide in the subunit.

Particularly the property that the light colour in the individual pixels may be changed by addressing a microshutter for the same light guide with another light filter.

It should be mentioned that the invention is not just limited to e.g. lighting of cars, but is also contemplated for many other applications, such as e.g. traffic signs, where intensity and subject are digitally controlled, e.g. as a function of traffic, weather and the like.

Other contemplated applications are within e.g. cockpits and cabins, cars, aircraft, trains, caravans, etc. park and garden lighting, swimming pools (underwater), works of art and buildings or environments which are difficult to access or greatly exposed.

What is claimed is:

1. A method of controlling light from one or more central light sources (1) to at least two lighting locations via light conductors (4), said light being conducted from the central light source or sources (1) to a control device (3) comprising a plurality of electrically individually controlled micromechanical shutters, each of which has a closed state and an open state, from which the light is conducted further on to the lighting locations via at least two optical guides (4) in the non-closed state of the microshutters.

2. A method according to claim 1, characterized in that the light is conducted from the central light source or sources (1) to the microshutters of the control unit via a plurality of optical guides (5').

3. A method according to claim 1, characterized in that the light is conducted from the central light source or sources (1) via precisely one optical guide (5').

4. A method according to claim 1, characterized in that light is conducted to at least one lighting location via a plurality of microshutters, the intensity of the light conducted to the lighting location being dependent on the number of opened microshutters.

5. A method according to claim 4, characterized in that the light is conducted to the lighting location from the control unit via precisely one optical guide (4').

6. A method according to claim 1, characterized in that the light from the light source (1) is focused in a light channel of the microshutter by means of one or more optical elements (11) and is then conducted from the control unit to the light guides via additional optical elements (13).

7. A method according to claim 1, characterized in that the intensity of the light at at least one lighting location is controlled by gradual opening and closing of an associated diaphragm.

8. A method according to claim 1, characterized in that the light is conducted from the central light source or sources to the microshutters of the control unit via at least one inserted diaphragm whose light passage is regulated by gradual closing of the diaphragm.

9. A method according to claim 1, characterized in that the light is conducted from the central light source or sources to lighting locations under temporal control, the relation between the period of time during which one or more microshutters are open and closed being regulated to provide a given intensity at the individual microshutters.

10. A method according to claim 9, characterized in that the period time of one or more of said microshutters is constant, it being possible to regulate the duty cycle from 0 to 100% as needed.

11. An apparatus for controlling light from one or more central light sources (1) to at least two lighting locations via light guides, said central light source or sources being optically connected at least one optical control device (3) comprising at least two electrically controlled mechanical microshutter diaphragms (15), each of which has at least two states, a closed state and an open state, from which the light is conducted further on to the lighting locations via optical guides (4) in the open state of the microshutters, each light guide being arranged to receive light from at least one microshutter.

12. An apparatus according to claim 11, characterized in that at least one of the light sources is arranged to illuminate a plurality of microshutters via a first lens arrangement (11), said lens arrangement (11) comprising a plurality of microlenses so arranged with respect to each microshutter that the light emitted by the light source or sources is focused on or in the vicinity of the optical axis of a light channel (12) of the individual microshutters.

13. An apparatus according to claim 11, characterized in that the focal plane of the focusing optics at the inlet side of the microshutters coincides completely or approximately with the diaphragms of the individual microshutters.

14. An apparatus according to claim 11, characterized in that the diaphragm devices include plates which are pivotally hinged/to the microshutter arrangement.

15. An apparatus according to claim 11, characterized in that the diaphragm of each individual microshutter is formed by an oscillating diaphragm element which is movable to and from between two positions, the oscillating diaphragm element being suspended such that elastic forces are applied to an equilibrium position between the two positions, said apparatus additionally comprising a control unit for controlling the oscillating diaphragm element by means of electrostatic forces, said diaphragm element blocking the light channel of the microshutter in one of the two positions.

16. An apparatus according to claim 11, characterized in that a optical connection between the control device and the light source or sources is formed by one or more light guides arranged to receive light from the light sources and to illuminate the microshutters of the control unit.

17. An apparatus according to claim 11, characterized in that at least one of the optical guides is arranged to receive light from a plurality of microshutters.

18. An apparatus according to claim 11, characterized in that the apparatus comprises a digital control unit for individual electrical control of the individual microshutters, said control unit comprising an allocation profile (51', 56' and 56) for face definition of the microshutters comprised by an optical control unit which is to be modulated.

19. An apparatus according to claim 11, characterized in that at least one microshutter is connected optically to a colour filter.

* * * * *